(12) United States Patent
Tanaka

(10) Patent No.: US 9,705,601 B2
(45) Date of Patent: Jul. 11, 2017

(54) DRIVER FOR PULSE AMPLITUDE MODULATION AND OPTICAL TRANSMITTER IMPLEMENTING THE SAME

(71) Applicant: SUMITOMO ELECTRIC INDUSTRIES, LTD., Osaka-shi, Osaka (JP)

(72) Inventor: Keiji Tanaka, Yokohama (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 14/952,276

(22) Filed: Nov. 25, 2015

(65) Prior Publication Data

US 2016/0156417 A1    Jun. 2, 2016

Related U.S. Application Data

(60) Provisional application No. 62/085,409, filed on Nov. 28, 2014.

(51) Int. Cl.
  *H04B 10/00* (2013.01)
  *H04B 10/54* (2013.01)
(52) U.S. Cl.
  CPC ................... *H04B 10/541* (2013.01)
(58) Field of Classification Search
  USPC .................................................. 398/189–191
  See application file for complete search history.

(56) References Cited

U.S. PATENT DOCUMENTS

| | | | | |
|---|---|---|---|---|
| 4,703,471 A * | 10/1987 | Fitelson | .............. | H04L 25/4923 398/139 |
| 6,151,149 A * | 11/2000 | Rybicki | .............. | H04L 25/4917 332/112 |
| 6,373,346 B1 * | 4/2002 | Kobayashi | ........... | H03D 7/1425 332/159 |
| 6,724,376 B2 * | 4/2004 | Sakura | ................. | H04B 10/508 327/109 |
| 6,750,717 B1 * | 6/2004 | Kobayashi | ........... | H03G 3/3084 330/254 |
| 8,599,944 B2 * | 12/2013 | Sato | ......................... | H03C 1/36 370/347 |
| 8,791,652 B2 * | 7/2014 | Oku | ...................... | H01S 5/0428 315/297 |
| 9,077,577 B1 * | 7/2015 | Ashrafi | ................. | H04L 27/362 |
| 9,094,130 B2 * | 7/2015 | Bliss | | |

(Continued)

FOREIGN PATENT DOCUMENTS

JP      2000-164973 A      6/2000

*Primary Examiner* — Agustin Bello
(74) *Attorney, Agent, or Firm* — Oliff PLC

(57) ABSTRACT

A pulse amplitude modulation (PAM) signal generator is disclosed. The PAM signal generator, which is applicable to a vertical cavity surface emitting laser diode (VCSEL), provides a plurality of differential units each having two outputs complementary to each other and biased by a power supply voltage through the commonly connected VCSEL and a dummy diode. The differential units have respective current sources each, where partial sums and a total sum of the currents correspond to the multiple output levels of the VCSEL. The PAM signal generator also provides compensating units to compensate the saturation (non-linearity) of the optical output of the VCSEL.

14 Claims, 9 Drawing Sheets

(56) References Cited

U.S. PATENT DOCUMENTS

| | | | | |
|---|---|---|---|---|
| 9,246,598 B2* | 1/2016 | Asmanis | ............ | H04B 10/588 |
| 9,331,875 B2* | 5/2016 | Ashrafi | ............ | H04L 27/362 |
| 9,548,811 B2* | 1/2017 | Kucharski | ............ | G02F 1/225 |
| 2001/0043093 A1* | 11/2001 | Sakura | ............ | H04B 10/508 |
| | | | | 327/108 |
| 2002/0167693 A1* | 11/2002 | Vrazel | ............ | G11C 27/02 |
| | | | | 398/27 |
| 2007/0171946 A1* | 7/2007 | Hase | ............ | H04B 10/508 |
| | | | | 372/29.02 |
| 2008/0002988 A1* | 1/2008 | Cheng | ............ | H04B 10/504 |
| | | | | 398/182 |
| 2010/0028022 A1* | 2/2010 | Cheng | ............ | H04B 10/541 |
| | | | | 398/200 |
| 2011/0123197 A1* | 5/2011 | Taylor | ............ | H04J 14/02 |
| | | | | 398/79 |
| 2013/0027763 A1* | 1/2013 | Hauenschild | ............ | H04B 10/541 |
| | | | | 359/276 |
| 2014/0321864 A1* | 10/2014 | Bliss | ............ | H04B 10/541 |
| | | | | 398/186 |
| 2015/0222366 A1* | 8/2015 | Asmanis | ............ | H04B 10/588 |
| | | | | 398/186 |
| 2015/0263812 A1* | 9/2015 | Tatsumi | ............ | H04B 10/505 |
| | | | | 398/189 |
| 2016/0156417 A1* | 6/2016 | Tanaka | ............ | H04B 10/541 |
| | | | | 398/186 |
| 2016/0248582 A1* | 8/2016 | Ashrafi | ............ | H04L 27/362 |
| 2017/0005731 A1* | 1/2017 | Nagarajan | ............ | H04B 10/70 |
| 2017/0019182 A1* | 1/2017 | Broekaert | ............ | H04B 10/524 |

\* cited by examiner

DRIVER FOR PULSE AMPLITUDE MODULATION AND OPTICAL TRANSMITTER IMPLEMENTING THE SAME

CROSS REFERENCE TO RELATED APPLICATION

This application claims benefit of U.S. Provisional Application 62/085,409 filed Nov. 28, 2014, which is incorporated herein by reference.

BACKGROUND OF THE INVENTION

Field of the Invention

The present application relates to a laser driver, in particular, the present application relates to a circuit for driving a semiconductor laser diode (hereafter denoted as LD) accompanied with a function of the multi-level amplitude modulation (AM).

Related Background Art

The United States Patent Application published as US20140321864A has disclosed a technique to generate a multi-level signal by driving a modulator which is divided into multi-segments. Another United Stated Patent published as US20130027763A has disclosed a technique to generate a multi-level amplitude modulation signal by a digital-to-analog converter (D/A-C).

In a recent optical communication system, as the transmission speed of the communication system has been further accelerated, an advanced system using the pulse amplitude modulation (hereafter denoted as PAM) has been requested substituting for the modulation using the non-return-to-zero (NRZ) signal; because a conventional technique to modulate an LD directly and/or indirectly using an external modulator shows some limitations in an operation speed thereof. When an electrical PAM signal is converted into an optical PAM signal, the electrical PAM signal generated by a multi-bit D/A-C drives an LD under an assumption that the LD shows a linear dependence of the output optical signal on the input electrical signal. Generally, a linear amplifier sets an operating point thereof in a region where the linear relation between the output and the input is obtained, because a nonlinearity of a slope degrades the power efficiency and resultantly increases the power consumption of the amplifier.

A circuit disclosed in the US20130027763A is a driver generating a PAM signal by a D/A-C, where respective amplifiers are unnecessary to be operated linearly but a circuit size to generate the PAM signal becomes extremely larger because one binary signal is converted into a multi-level signal, for instance, a binary signal of three (3) bits is converted into a PAM signal with 8 levels. The circuit disclosed in the US20140321864A generates a PAM signal by dividing an optical device such as an LD and/or a modulator into several segments and modulates the respective segments by signals different from each other. The circuit disclosed therein may be reduced a size thereof compared with the circuit disclosed in the former reference, but the optical device and the driver circuit are necessary to be designed concurrently.

Accordingly, the optical device applicable to such circuit is limited to, for instance, a Mach-Zehnder modulator which is generally costly device.

SUMMARY OF THE INVENTION

An aspect of the present application relates to an optical transmitter, where the optical transmitter receives a binary code signal having N-bits and generates an output optical signal containing multiple levels. The optical transmitter includes a semiconductor laser diode (LD), N units of modulation sources, and a bias source. Each of the modulation sources provides modulation currents to the LD. The modulation currents are different from each other. The bias source superposes a bias current on the modulation currents. A feature of the optical transmitter of the present invention is that the multiple levels appearing in the output optical signal correspond to a count and places of a HIGH level in the input binary code.

Another aspect of the present application relates to a driver that drives a semiconductor laser diode (LD). The driver receives an input binary signal having N-bits (N>1). The driver comprises a plurality of modulation sources and a bias source. The modulation sources are connected in series to the LD but in parallel to each other. The modulation sources receive respective bits in the input binary signal and provide respective modulation currents to the LD. The bias source, which is connected in series to the LD but in parallel to the modulation sources, superposes a bias current on the modulation currents. A feature of the driver of the present application is that the modulation currents have magnitudes different from each other but have no overtone relations, which mean that any of combinations of the modulation currents does not become equal to any of the modulation currents.

Still another aspect of the present application relates to a pulse amplitude modulation (PAM) signal generator. The PAM signal generator of the present application receives a plurality of input signals and outputs one output signal having multiple levels corresponding to a binary code signal comprised of the input signals. The PAM signal generator comprises a plurality of modulation sources and a combiner. The modulation sources each receive the input signals and output weighted signals. The combiner generates the output signal by superposing the respective weighted signals. A feature of the PAM signal generator of the present application is that the weighted signals each have weighting factors of $2^n$, where n is a positive integer and zero.

BRIEF DESCRIPTION OF THE DRAWINGS

The foregoing and other purposes, aspects and advantages will be better understood from the following detailed description of a preferred embodiment of the invention with reference to the drawings, in which.

DESCRIPTION OF THE PREFERRED EMBODIMENTS

First Embodiment

Figure 1:
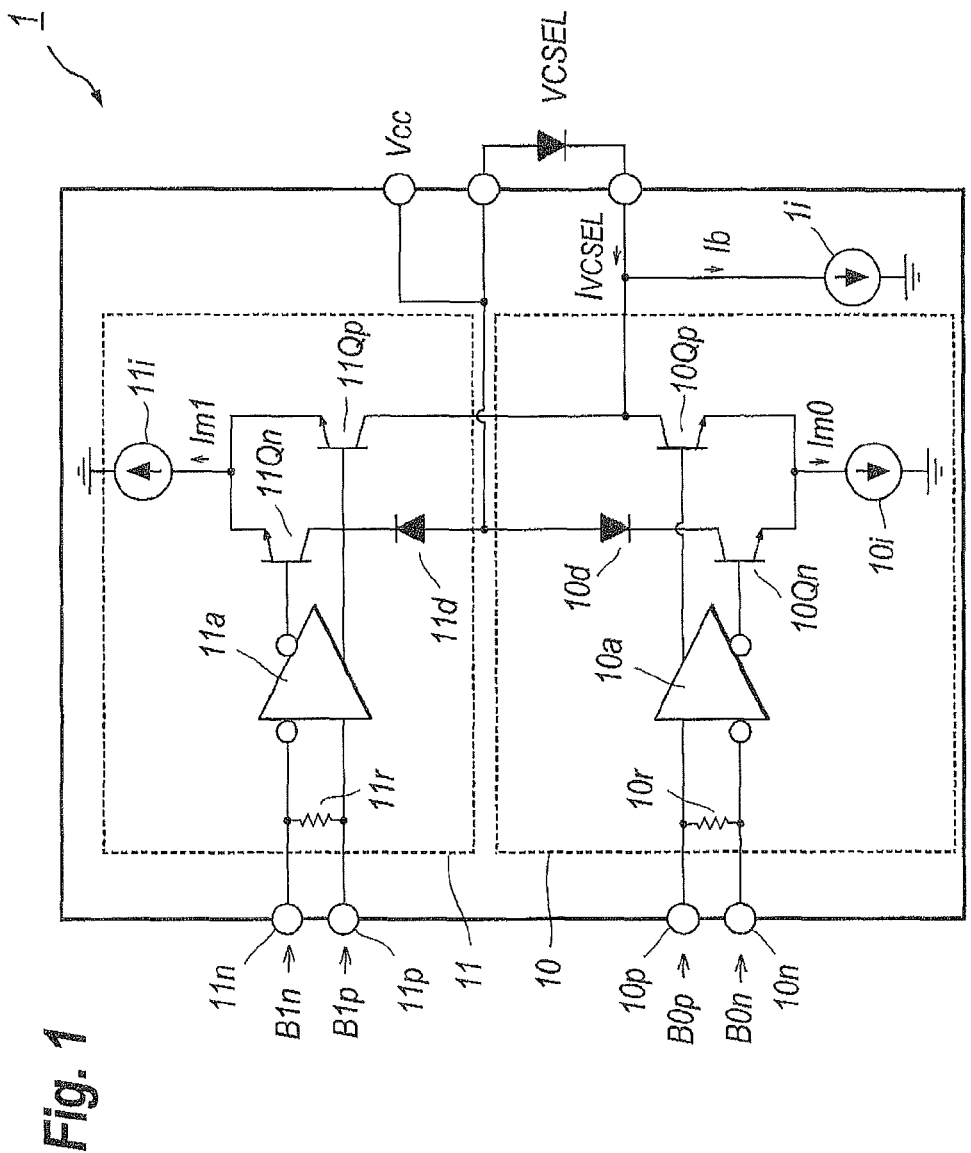
FIG. 1 is a circuit diagram of a PAM signal generator according to the first embodiment of the present application.

FIG. 1 shows a circuit diagram of a PAM signal generator according to the first embodiment of the present application. The PAM signal generator 1 shown in FIG. 1 includes two modulation sources, 10 and 11, one of which is comprised of an amplifier 10a, two transistors, 10Qp and 10Qn, a current source 10i, a resistor 10r, and a diode 10d. While, the other modulation source 11 is comprised of an amplifier 11a, two transistors, 11Qp and 11Qn, a current source 11i, a resistor 11r, and a diode 11d. In the symbols appearing hereinafter, a suffix n represents that the parameters or elements accompanying with n correspond to those of the negative phase, and another suffix p represents that the parameters or elements accompanying therewith correspond to those for the positive phase. Two modulation sources, 10 and 11, are each connected in series to an laser diode (LD) between the source voltage Vcc and the ground but commonly connected in parallel with respect to the LD of the type of the vertical cavity surface emitting laser diode (hereafter denoted as VCSEL). Specifically, the first modulation source receives a first input signal, B0p and B0n, in the first input ports, 10p and 10n. The emitters of the first paired transistors, 10Qp and 10Qn, are grounded through a first current source 10i that generates a first modulation current Im0. One of the paired transistors 10Qp is biased by the power supply voltage Vcc through the VCSEL, and the other of the paired transistors 10Qn is also biased by the power supply voltage Vcc but through a first dummy diode 10d.

The other modulation source 11 receives the second input signals, B1p and B1n, with the differential configuration in the second input ports, 11p and 11n. The common emitter of the second paired transistors, 11Qp and 11Qn, is grounded through a second current source 11i that generates a second modulation current Im1. One of the second paired transistors 11Qp is biased by the source voltage Vcc through the VCSEL, and the other of the second paired transistors 11Qn is also biased by the source voltage Vcc but through the second dummy diode 11d. Thus, when the dummy diodes, 10d and 11d, have characteristics substantially same as those of the VCSEL, two modulation sources are completely symmetrical to each other; that is, two modulation sources are connected in parallel between the source voltage Vcc and the ground; but connected in series to the VCSEL, respectively.

A feature of the PAM signal generator 1 shown in FIG. 1 is that two current sources, 10i and 11i, generate respective modulation currents, Im0 and Im1, different from each other. Specifically, the two modulation currents, Im0 and Im1, have respective magnitudes determined by a relation of $2^n$, where n=0 and 1, respectively. That is, the modulation current Im1 of the second modulation source 11 has the magnitude substantially twice of the other modulation current Im0. Accordingly, the VCSEL driven by the PAM signal generator 1 of FIG. 1 may generate the first optical power when only the first modulation source 10 receives a HIGH level signal, which is different from the second optical power when only the second modulation source 11 receives the HIGH level signal. Moreover, the VCSEL may further generate the third optical power when both of the modulation sources, 10 and 11, receive the HIGH level signals. When both of the modulation sources, 10 and 11, receive the LOW levels, which turn off the positive phase transistors, 10Qp and 11Qp; no modulation currents flow in the VCSEL and only the bias current Ib is provided to the VCSEL. The table below summarizes the relation above described.

TABLE I

| Input | | Current flowing |
|---|---|---|
| B1 | B0 | in VCSEL |
| L | L | Ib |
| L | H | Ib + Im0 |
| H | L | Ib + Im1 |
| H | H | Ib + Im1 + Im0 |

Figure 2:
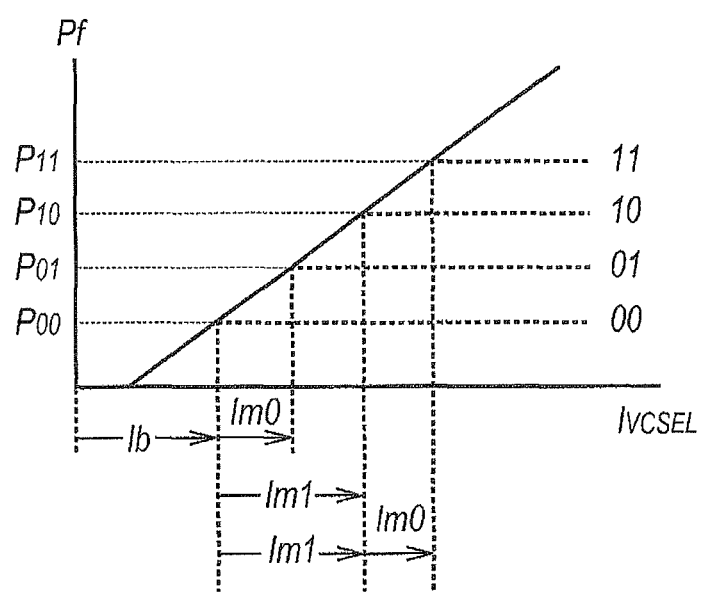
FIG. 2 schematically illustrates an I-L (current to optical output) curve of the VCSEL driven by the circuit in FIG. 1.

FIG. 2 schematically illustrates the relation between the output power Pf and the input current of the VCSEL, which is often called as the I-L characteristic. FIG. 2 assumes that the second modulation current Im1 is greater than the first modulation current Im0. When both inputs, B0p and B1p, are set in the LOW level; only the bias current Ib provided from the current source 1i flows in the VCSEL to emit an optical signal with a minimum power $P_{00}$, which corresponds to a logic level of "00". When the first input B0p turns HIGH, the total current of Ib+Im0 flows in the VCSEL to show the optical output power of the second minimum power $P_{01}$ corresponding to a logic level of "01". When only the second input B1p turns HIGH, the current of a sum of Ib and Im1 flows in the VCSEL which generates an optical signal with the third minimum power $P_{10}$ corresponding to a logic level of "10". Finally, when both of the first and second inputs, B0p and B1p, become HIGH, the total current of Ib, Im0, and Im1 flow in the VCSEL which generates an optical signal with the maximum power $P_{11}$ corresponding to a logic level of "11". Thus, the PAM signal generator 1 shown in FIG. 1 may generate a PAM signal with four distinguishable currents and an optical signal having four distinguishable powers each corresponding to the logic levels of "00", "01", "10", and "11". Only one VCSEL may generate an optical signal corresponding to four logic levels.

Second Embodiment

Figure 3:
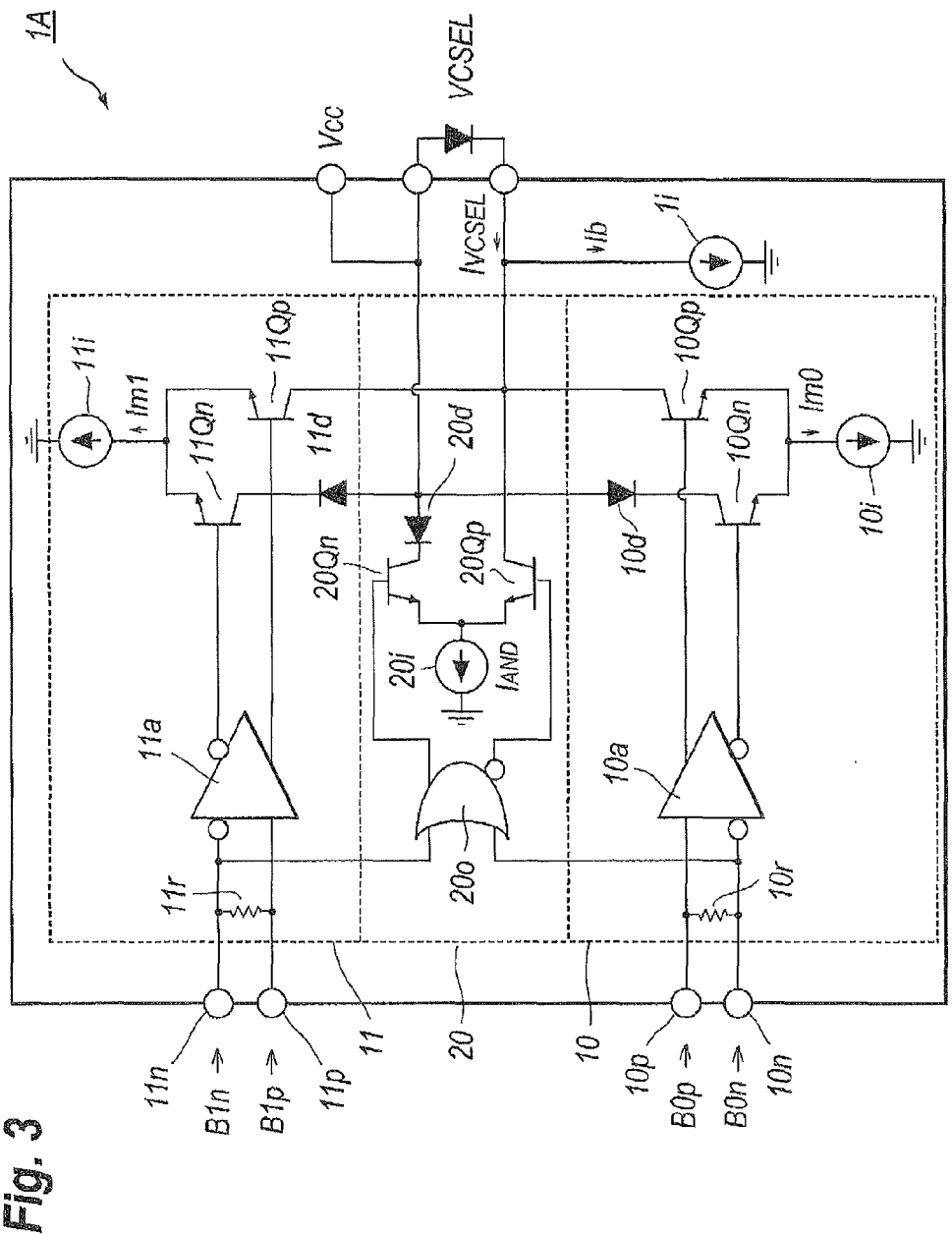
FIG. 3 shows a circuit diagram of a PAM signal generator according to the second embodiment of the present invention.

FIG. 3 shows a circuit diagram of another PAM signal generator 1A according to the second embodiment of the present invention. The PAM signal generator 1 of the first embodiment assumes that the optical output power of the VCSEL is proportional to the magnitude of the driving current, that is, the slope of the I-L characteristic shown in FIG. 2, which is called as the slope efficiency, becomes linear. That is the PAM signal generator 1 of the aforementioned embodiment assumes that the slope efficiency is approximated in constant within a range of the driving current.

However, a practical VCSEL shows a non-linear characteristic in the I-L curve, that is, the slope efficiency thereof becomes smaller in a region of a larger driving current. Accordingly, the logic level of "11" in the optical power $P_{11}$ thereof becomes closer to the optical power $P_{10}$ corresponding to the logic level of "10". The PAM signal generator 1A shown in FIG. 3 may compensate this non-linearity of the I-L characteristic of the VCSEL.

That is, the PAM signal generator 1A shown in FIG. 3, in addition to those shown in FIG. 1, further includes a compensating unit 20 including a NOR gate 20o, a differential unit comprising the paired transistors, 20Qp and 20Qn, and a current source 20i. The compensating unit 20 is connected in parallel to the first and second modulation sources, 10 and 11. One of transistors 20Qp in the compensating unit 20 is biased by the power supply voltage Vcc through the VCSEL and the other transistor Q20n is also biased by the power supply voltage Vcc but through the third dummy diode 20d. The common emitter of the paired transistors, 20Qp and 20Qn, is grounded through the current source 20i that generates a compensating current $I_{AND}$. A feature of the compensating unit 20 is that the paired transistors, 20Qp and 20Qn, receives the negative inputs, B0n and B1n, of respective input signals through the NOR gate 20o, and one of the paired transistors 20Qp biased through the VCSEL is driven by the negative output of the NOR gate 20o. That is, the transistor 20Qp is driven by the NOR gate 20o whose inputs are connected to the respective negative inputs, 10Bn and 11Bn. This arrangement is equivalent to an arrangement that the transistor 20Qp is driven by an output with the positive logic of a NAND gate that receives the inputs of the negative logic. The transistor 20Qp turns on only when both inputs, B0n and B1n, of the NAND gate becomes LOW, that is, the transistor 20Qp turns on only when both inputs, B0p and B1p, become HIGH, which means that the compensating unit 20 provides the compensating current $I_{AND}$ to the VCSEL only when both inputs, B0p and B1p, are set in the HIGH level. The table below summarizes the truth table of the PAM signal generator 1A shown in FIG. 3 and the total current flowing in the VCSEL.

TABLE II

| Input | | Current flowing |
|---|---|---|
| B1 | B0 | in VCSEL |
| L | L | Ib |
| L | H | Ib + Im0 |
| H | L | Ib + Im1 |
| H | H | Ib + Im0 + Im1 + $I_{AND}$ |

Figure 4:
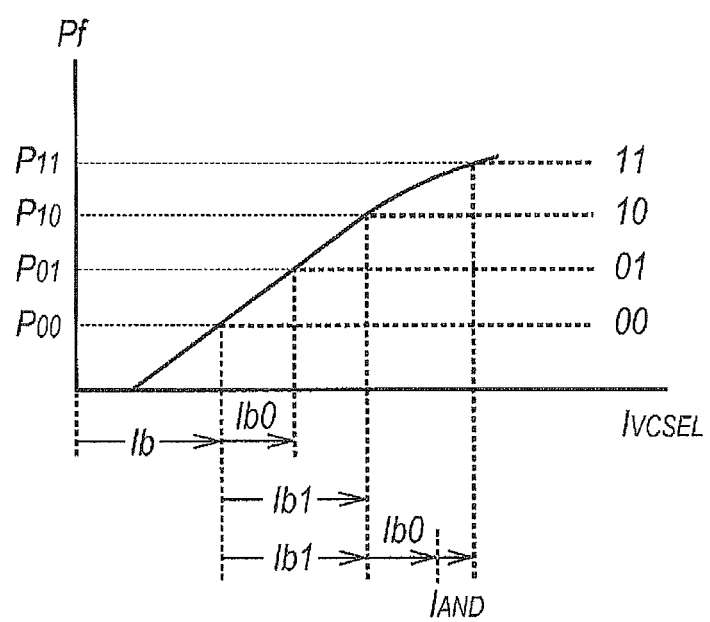
FIG. 4 shows the I-L characteristic practically shown in the VCSEL and the currents flowing in the VCSEL taking the additional current $I_{AND}$ supplied from the compensating unit.

FIG. 4 shows the I-L characteristic of a VCSEL and the currents flowing in the VCSEL taking the additional current $I_{AND}$ provided from the compensating unit 20 into account. Although the optical output power of a VCSEL shows saturation in a larger bias current, the additional current $I_{AND}$ provided from the compensating unit 20 may effectively compensate the saturation in the optical output power, and a substantial difference to discriminate between adjoining two logic levels, "11" and "10", may be secured in the optical output power, $P_{10}$ and $P_{11}$, between the logic levels of "10" and "11".

Figure 5:
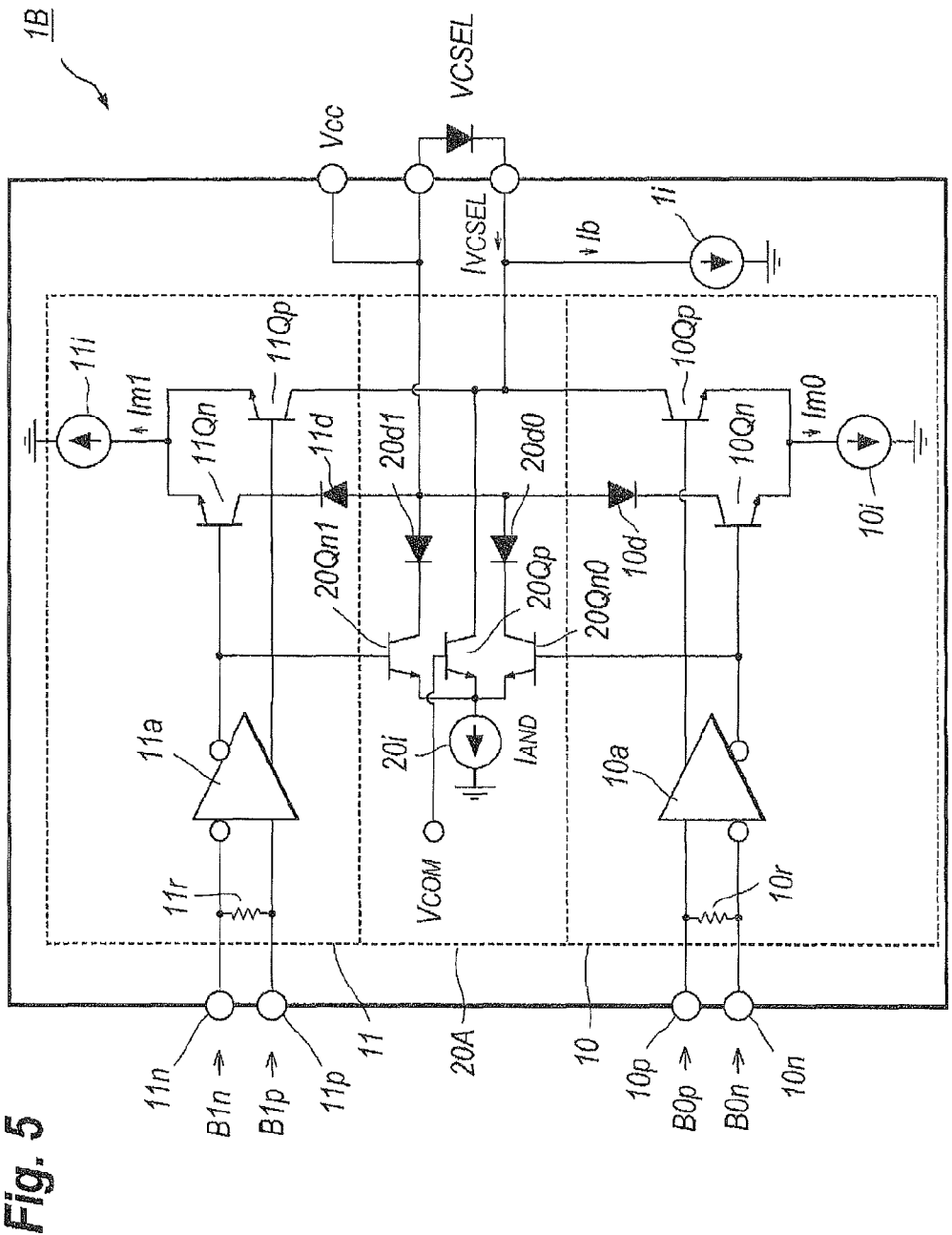
FIG. 5 shows another circuit diagram modified from that shown in FIG. 3.

FIG. 5 shows another circuit diagram of a PAM signal generator 1B which is modified from the PAM signal generator 1A shown in FIG. 3. The PAM signal generator 1B shown in FIG. 5 performs the same function as those of the PAM signal generator 1A shown in FIG. 3 but omits the NOR gate 20o. That is, the circuit of FIG. 5 further includes, in addition to the primary PAM signal generator 1 shown in FIG. 1, a compensating unit 20A comprising a paired transistors, 20Qp and (20Qn0 and 20Qn1), and a current source 20i that generates the compensating current $I_{AND}$.

The transistor 20Qp receives a reference level Vcom in the base thereof and biased by the power supply voltage Vcc through the VCSEL. The other two transistors, 20Qn0 and 20Qn1, are biased also by the power supply voltage Vcc but through respective dummy diodes, 20d0 and 20d1. The common emitters of the paired transistor, 20Qp to 20Qn1, are grounded through the current source 20i that generates the compensating current $I_{AND}$. A feature of the modified PAM signal generator 1B shown in FIG. 5 is that the transistors, 20Qn0 and 20Qn1, receive negative phase outputs of respective amplifiers, 10a and 11a.

The function of the compensating unit 20A will be described. For the compensating unit 20A, when at least one of the negative phase inputs of the transistors, 20Qn0 and 20Qn1, becomes HIGH; the compensating current $I_{AND}$ flows in the dummy diodes, 20d0 and/or 20d1, and substantially no bias current $I_{AND}$ flows in the positive phase transistor 20Qp, which means that no additional current flows in the VCSEL. In other words, the compensating current $I_{AND}$ flows in the transistor 20Qp only when both of the negative phase transistors, 20Qn0 and 20Qn1, turn off. Because the negative phase transistors, 20Qn0 and 20Qn1, receive the negative phase outputs of the respective amplifiers, 10a and/or 11a; the positive phase transistor 20Qp turns on to cause the compensating current $I_{AND}$ flowing only when both of the positive phase inputs, B0p and B1p, become HIGH. Thus, the compensating current $I_{AND}$, or the additional current, flows in the VCSEL only when two positive phase inputs, B0p and B1p, become HIGH. The saturation of the output optical power of the VCSEL in a large bias current region may be compensated. The compensation secures a substantial difference to discriminate between the adjoining two logic levels of "10" and "11".

Third Embodiment

Although the present invention has been fully described in conjunction with the preferred embodiment thereof with reference to the accompanying drawings, it is to be understood that various changes and modifications may be apparent to those skilled in the art. For instance, embodiments thus described concentrate on the PAM signal generator for two logical signals, namely, the PAM signal generator that generates four distinguishable optical levels, $P_{00}$ to $P_{11}$. However, the concept of the present PAM signal generator may be expanded to a logical signal with three (3) bits, namely, eight (8) output levels, or more.

Figure 6:
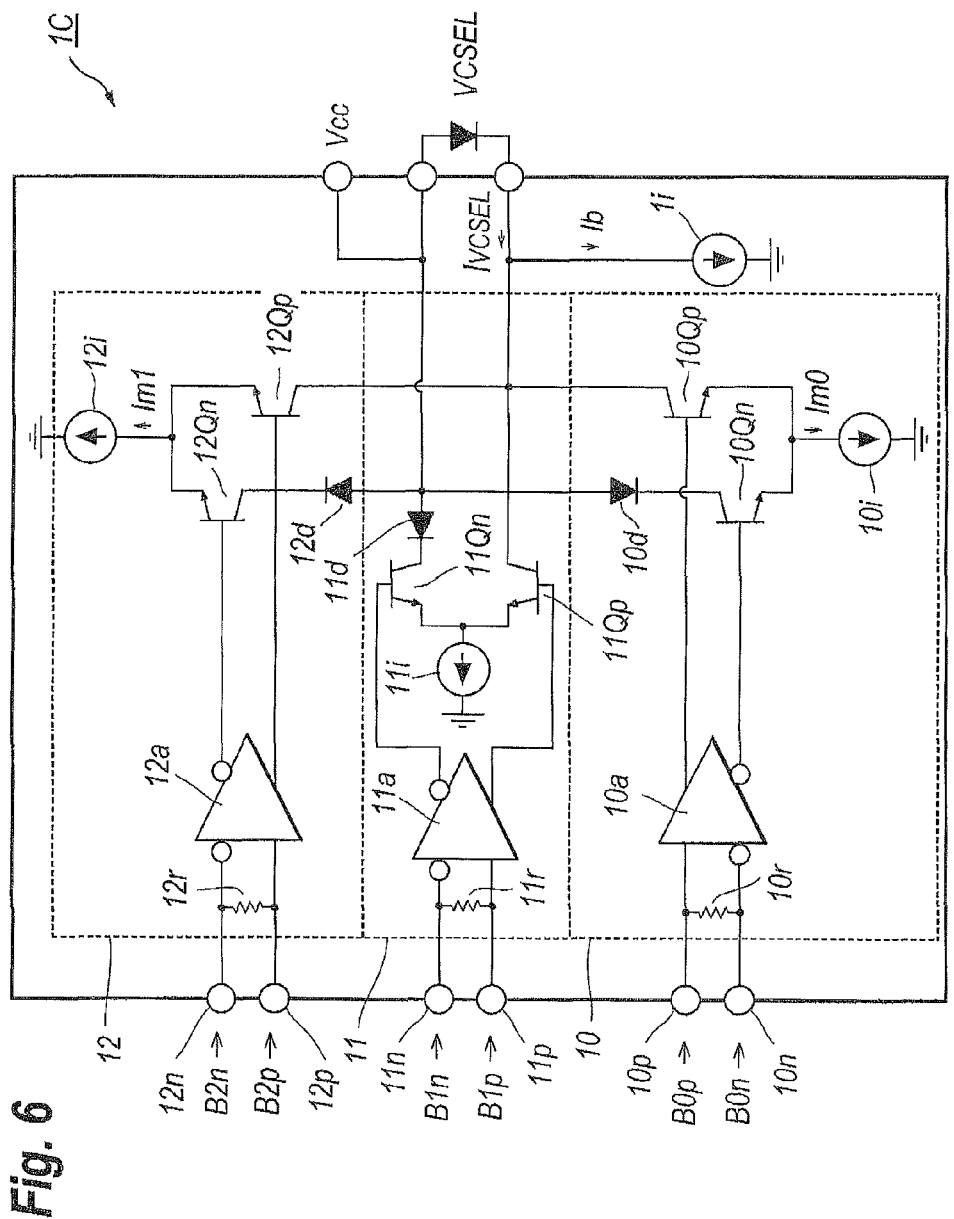
FIG. 6 is a circuit diagram of a PAM signal generator that converts a logic signal of three (3) bits into eight (8) optical output levels.

FIG. 6 is a circuit diagram of a PAM signal generator 1C that converts a logic signal with three (3) bits into eight (8) output levels. The PAM signal generator 1C shown in FIG. 6 provides three modulation sources, 10 to 12, arranged in parallel to each other and connected in series to the VCSEL. Respective modulation sources, 10 to 12, provide current sources, 10i to 12i, to generate specific modulation currents Imi (i=0 to 2) to the VCSEL. The magnitudes of the modulation currents Imi are assumed to be Im0<Im1<Im2 in the explanation below. Further specifically, the modulation current Im2 is twice of the modulation current Im1, and the modulation current Im1 is twice of the modulation current Im0.

Respective modulation sources, 10 to 12, may provide the modulation currents Imi only when the inputs Bip (i=0 to 2) thereof become HIGH. The table below shows a relationship between the current flowing in the VCSEL and the possible combinations of the respective modulation sources, 10 to 11.

TABLE III

| Input | | | Current flowing |
|---|---|---|---|
| B2 | B1 | B0 | in VCSEL |
| L | L | L | Ib |
| L | L | H | Ib + Im0 |
| L | H | L | Ib + Im1 |
| L | H | H | Ib + Im0 + Im1 |
| H | L | L | Ib + Im2 |
| H | L | H | Ib + Im0 + Im2 |
| H | H | L | Ib + Im1 + Im2 |
| H | H | H | Ib + Im0 + Im1 + Im2 |

Figure 7:
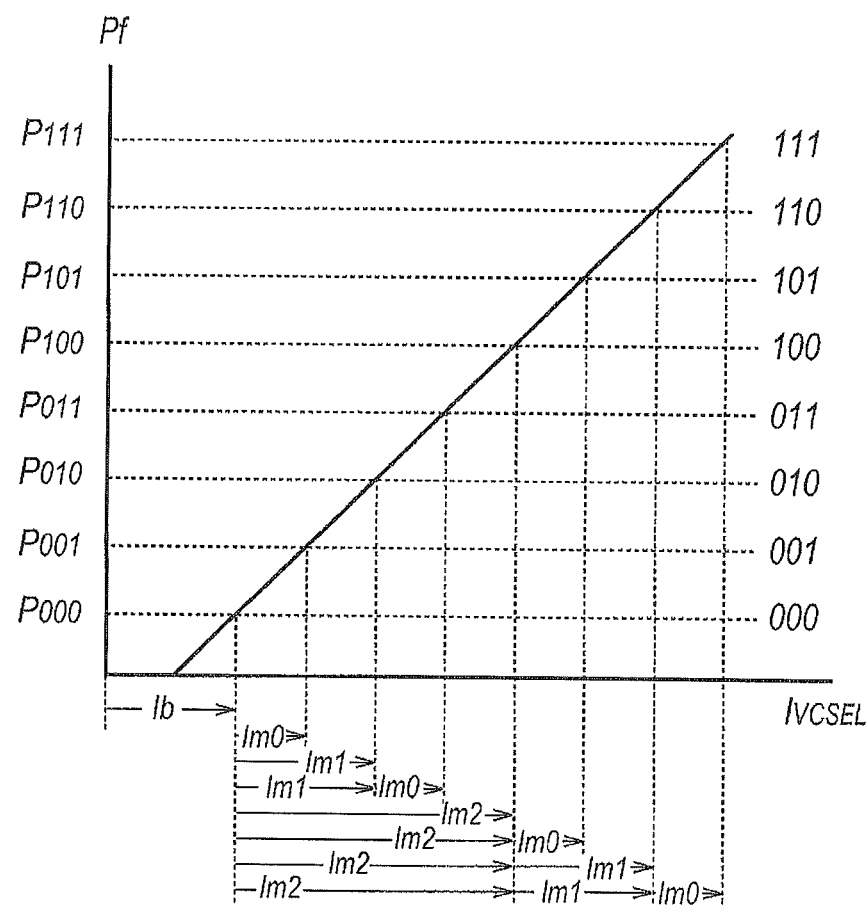
FIG. 7 shows the I-L characteristic of the VCSEL driven by the PAM signal generator shown in FIG. 6.

FIG. 7 shows the I-L characteristic of the VCSEL driven by the PAM signal generator shown 1C in FIG. 6, where FIG. 7 assumes that the VCSEL shows no output saturation. As described, when respective modulation currents Imi(i=0 to 2) are assumed to have the relation of Im0<Im1<Im2, the optical output power of the VCSEL may give secure (8) logic levels. Specifically, the second modulation current Im1 has the magnitude twice of the first modulation current Im0, and the third modulation current Im2 has the magnitude twice of the second modulation current Im1. However, the relation between the modulation currents Imi (i=0 to 1) is not restricted to those, and as long as the conditions of Im1>Im0 and Im2>Im1+Im0 are satisfied; that is, the modulation currents, Im0 to Im2, have no overtone relations, which means that any of combinations of the modulation currents does not become equal to any of the modulation currents. The VCSEL driven by thus configured driver may generate the optical output power accompanying with eight distinguishable levels, $P_{000}$ to $P_{111}$.

Figure 8:
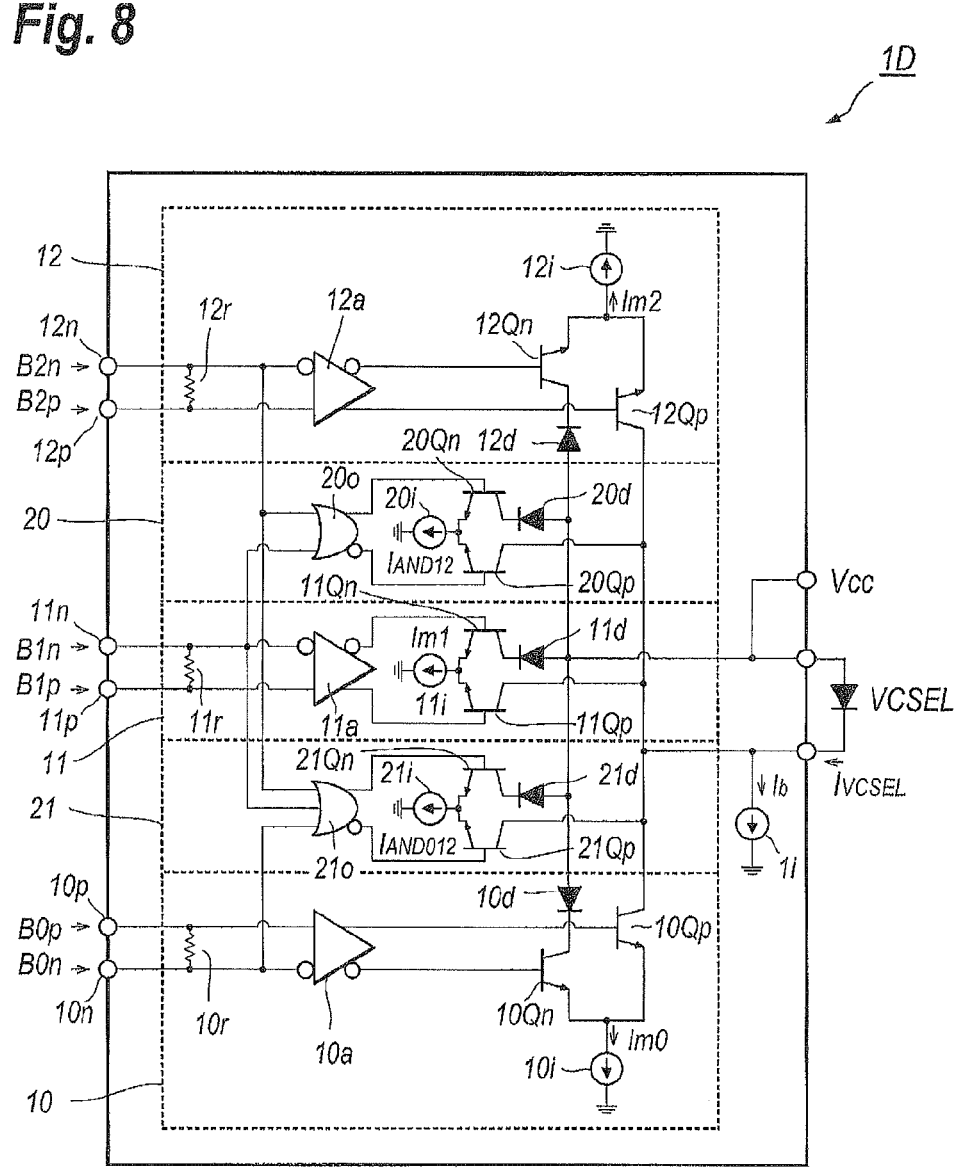
FIG. 8 is a circuit diagram of a PAM signal generator that distinguishes eight (8) output levels and has two (2) compensating units.

Even when the PAM signal generator 1C receives an input binary signal with three (3) bits and generates eight distinguishable driving currents, the compensation of the non-linearity caused by the output saturation of the VCSEL may be carried out. FIG. 8 is a circuit diagram of a PAM signal generator 1D that generates distinguishable eight (8) output levels and accompanies with the compensating units, 20 and 21. As described, because the optical output power of the VCSEL shows saturation, the PAM signal generator 1D shown in FIG. 8 provides two compensating units, 20 and 21, where the former 20 is for the output level corresponding to the current of Im1+Im2, and the latter 21 is for compensating with the output level corresponding to the current of Im0+Im1+Im2. The former compensating unit 20 includes a NOR gate 20o and the differential pair of transistors, 20Qp and 20Qn, provided in the downstream of the NOR gate 20o. The NOR gate 20o receives the negative inputs, B1n and B2n, of the PAM signal generator 1D, and positively drives the negative phase transistor 20Qn, where the compensating current $I_{AND12}$ flows in the dummy diode 20d when at least one of the inputs of the NOR gate 20o becomes HIGH. This means that the compensating current $I_{AND12}$ flows in the VCSEL only when both of the negative inputs, B1n and B2n, become LOW, that is, both of the positive inputs, B1p and B2p, become HIGH. Accordingly, the PAM signal generator 1D shown in FIG. 8 generates the driving current of Ib+Im1+Im2+$I_{AND12}$ to the VCSEL corresponding to a combination of the inputs "110".

The other compensating unit 21, which includes the NOR gate 21o and the differential pair of transistors, 21p and 21Qn, operates in a similar manner with those of the former compensating unit 20 described above. The NOR gate 21o in the negative output thereof becomes HIGH only when all of the negative inputs, B0n, B1n, and B2n, of the PAM signal generator 1D become LOW; that is three positive inputs, B0p to B2p, become HIGH. This compensating unit 21 provides the other compensating current $I_{AND012}$ to the VCSEL in addition to respective modulation currents, Im0, Im1, Im2, and the former compensating current $I_{AND12}$. Thus, the saturation of the optical output power of the VCSEL corresponding to the driving current of Im0+Im1+Im2 may be compensated by the additional currents, $I_{AND012}$ and $I_{AND12}$. Because the saturation of the optical output power becomes large for the driving current of Im0+Im1+Im2, the latter compensating current $I_{AND012}$ is preferably greater than the former compensating current $I_{AND12}$. Because the modulation current Im0+Im1 is smaller than the modulation current Im2, the PAM signal generator shown 1D in FIG. 8 omits a compensating unit for the driving current Im0+Im1.

Figure 9:
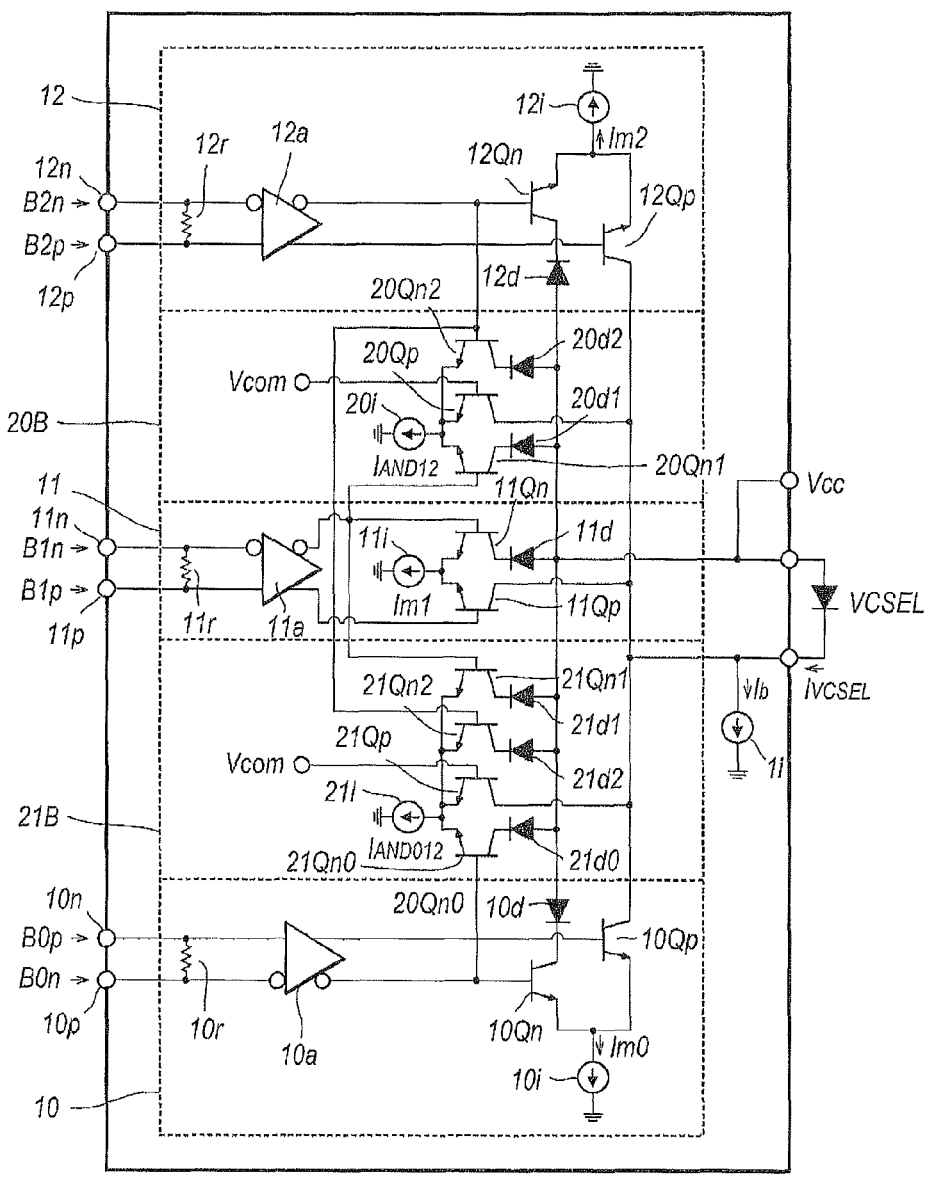
FIG. 9 is a circuit diagram of another PAM signal generator that generates the driving current for the VCSEL with eight distinguishable levels and has the compensating unit for the saturation of the optical output power of the VCSEL.

FIG. 9 is a circuit diagram of another PAM signal generator 1E that may generate the modulation current for the VCSEL accompanying with eight distinguishable logic levels and providing two compensating units, 20B and 21B, for compensating with the saturation of the output optical power of the VCSEL, where the circuit shown in FIG. 9 corresponds to that shown in FIG. 8. That is, the compensating units, 20B and 21B, of the PAM signal generator shown in FIG. 9 removes two NOR gates, 20o and 21o, in FIG. 8 but provides two differential units, 20B and 21B, where the former 20B is comprised of three transistors, 20Qp to 20Qn2, and the latter 21B includes four transistors, 21Qp to 21Qn2. The mechanism to superpose the compensating currents, $I_{AND12}$ and $I_{AO12}$, on respective driving currents, Im1+Im2 and Im0+Im1+Im2, is the same with those described for the circuit of FIG. 8.

That is, the transistor 20Qp only turns on to supply the compensating current $I_{AND12}$ to the VCSEL when the other two transistors, 20Qn1 and 20Qn2, each receive signals of the LOW level, which means that the negating outputs of two amplifiers, 11a and 12a, become LOW; equivalently, respective positive inputs, B1p and B2p, become HIGH. In the other compensating unit 21B, the transistor 21Qp only turns on when the other three transistors, 21Qn0 to 21Qn2, all turns off; that is, the other three transistors, 21Qn0 to 21Qn2, receive the LOW levels of the negative outputs of respective amplifier, 10a to 12a; equivalently, all of the positive inputs, B0p to B2p, of the PAM signal generator 1E become HIGH.

Thus, the compensating current $I_{AND12}$ is provided only when two positive inputs, B1 and B2, become HIGH, which corresponds to the input status of "110" or "111", and another compensating current $I_{AND012}$ is provided only when all three inputs, B0p to B2p, become HIGH, which corresponds to the input status of "111".

In the foregoing detailed description, the method and apparatus of the present invention have been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

What is claimed is:
1. An optical transmitter that receives an input binary code configured with N-bits and generates an output optical signal with multiple levels, comprising:
   a semiconductor laser diode (LD);
   N units of modulation sources each connected in series to the LD and in parallel to each other, the modulation sources each providing modulation currents to the LD, the modulation currents being different from each other; and a bias source that superposes a bias current on the modulation currents, wherein the multiple levels in the output optical signal output from the LD correspond to a count and places of a HIGH level in the input binary code.

2. The optical transmitter of claim 1, wherein the modulation sources each include a pair of transistors and a current source, the pair of transistors receiving the input binary code and being biased through the LD and a dummy diode, the current source being commonly connected to the pair of transistors and generating the respective modulation currents, and wherein the pair of transistors switch the respective modulation currents between the LD and the dummy diodes according to the input binary code.

3. The optical transmitter of claim 2, further comprising one or more compensating units configured to superpose compensating currents on the modulation currents, wherein the compensating currents compensates non-linearity in a current-to-optical output characteristic of the LD.

4. The optical transmitter of claim 3, wherein the compensating units each provide a gate circuit including a switch and a current source that generates the compensating current, the gate circuit being coupled with the input binary code and connecting the current source with the LD by driving the switch.

5. The optical transmitter of claim 4, wherein the switches in each of the compensating units include respective pairs of transistors commonly connected to the current sources of the respective compensating units and biased through the LA and dummy diodes, respectively, and wherein the gate circuits turn on the one of the paired transistors biased through the LD in the respective compensating units when the input binary code matches with respective bit patterns.

6. The optical transmitter of claim 3, wherein the optical, transmitter includes two (2) modulation sources and one compensating unit, and wherein the compensating unit superposes the compensating current on the modulation currents when the input binary code has a bit pattern of "11".

7. The optical transmitter of claim 3, wherein the optical transmitter includes three (3) modulation sources and two compensating units, and wherein one of the two compensating units superposes the compensating current on the modulation currents when the input binary code has a bit pattern of "111", and another of the compensating units superposes another compensating current on the modulation currents when the input binary code has bit patterns of "111" and "110".

8. The optical transmitter of claim 1, wherein the LD has a type of vertical cavity surface emitting laser diode (VCSEL).

9. A driver that drives a semiconductor laser diode (LD), the driver receiving an input binary signal having N-bits, where N is greater than unity, comprising:

a plurality of modulation sources connected in series to the LD and in parallel to each other, the modulation sources receiving respective bits in the input binary signal and providing respective modulation currents to the LD; and a bias source connected in series to the LD and in parallel to the modulation sources, the bias source superposing a bias current on the modulation currents, wherein the modulation currents each have magnitudes different from each other but have no overtone relations.

10. The driver of claim 9, wherein the modulation sources include differential amplifiers, respective pairs of transistors provided in downstream of the differential amplifiers, and current sources connected commonly to the respective paired transistors, the respective pairs of the transistors being biased through the LD and dummy diodes, and wherein the respective pairs of the transistors in the modulation sources switch the modulation currents generated in the respective current sources between the LD and the dummy diodes.

11. The driver of claim 10, further comprising a compensating unit connected in series to the LD and in parallel to the modulation sources, wherein the compensating unit superposes a compensating current on the modulation currents when the input binary signal is set in all of the n-bits thereof in HIGH levels.

12. The driver of claim 11, wherein the compensating unit includes a gate circuit, a pair of transistors provided in downstream of the gate circuit, and a current source connected commonly to the pair of the transistors of the compensating unit, wherein the pair of the transistors of the compensating unit is biased through the LD and a dummy diode, respectively, and wherein the gate circuit switches the compensating current between the LD and the dummy diode of the compensating unit through the pair of the transistors of the compensating unit only when the input binary signal are set in all of bits thereof in the HIGH level.

13. The driver of claim 11, wherein the compensating unit includes one positive phase transistor, a plurality of negative phase transistors, and a current source, the positive phase transistor being biased through the LD and receiving a reference signal, the negative phase transistors being biased through respective dummy diodes and coupled with the respective bits of the input binary signal, the positive phase transistor and the negative phase transistors being commonly connected to a current source that generates the compensating current, and wherein the positive phase transistor is turned on only when all of the bits of the input binary signal are set in the HIGH level.

14. The driver of claim 10, further comprising plurality of compensating units each connected in series to the LD and in parallel to the modulation sources, wherein the compensating units generate respective compensating currents different from each other and corresponding to respective statuses of the input binary signal.

* * * * *